W. CLOTHIER.
AUTOMATIC WEIGHING MACHINE.
APPLICATION FILED DEC. 3, 1912.
1,061,983.
Patented May 20, 1913.
3 SHEETS—SHEET 3.
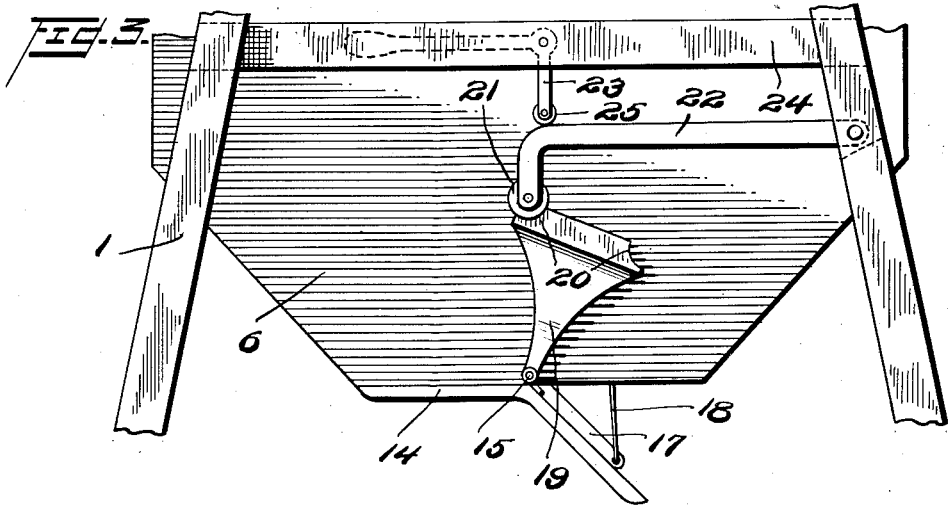
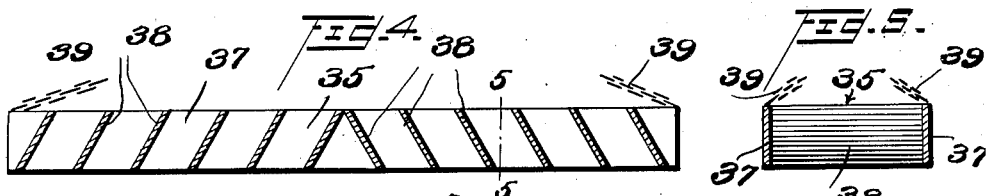
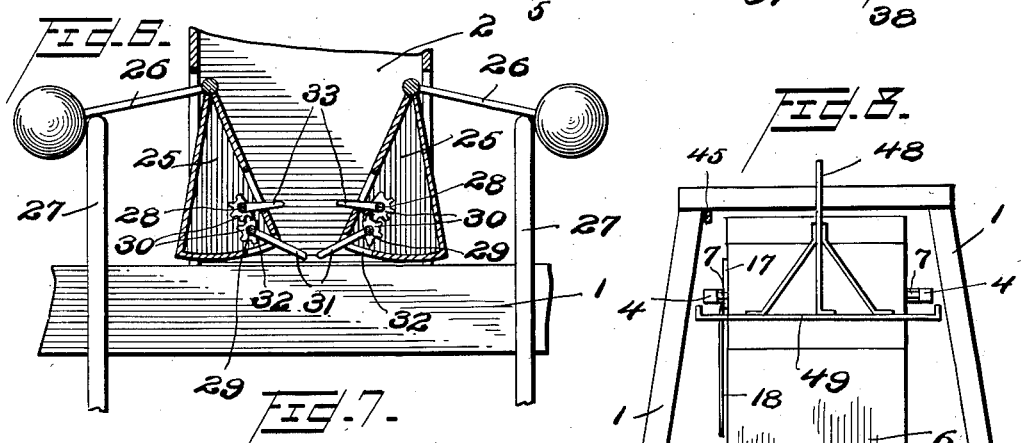
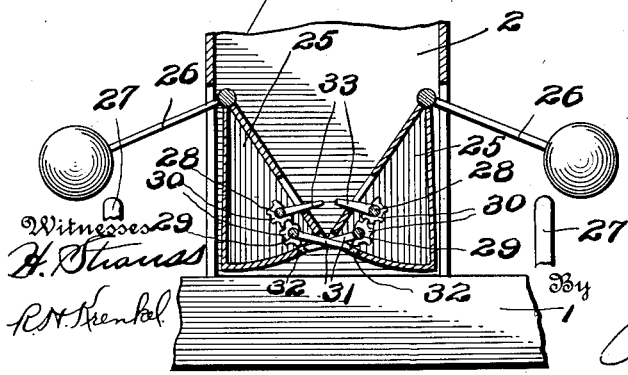
Inventor
Willis Clothier
Witnesses
H. Strauss
R. N. Krenkel
By Joshua R. H. Potts
Attorney

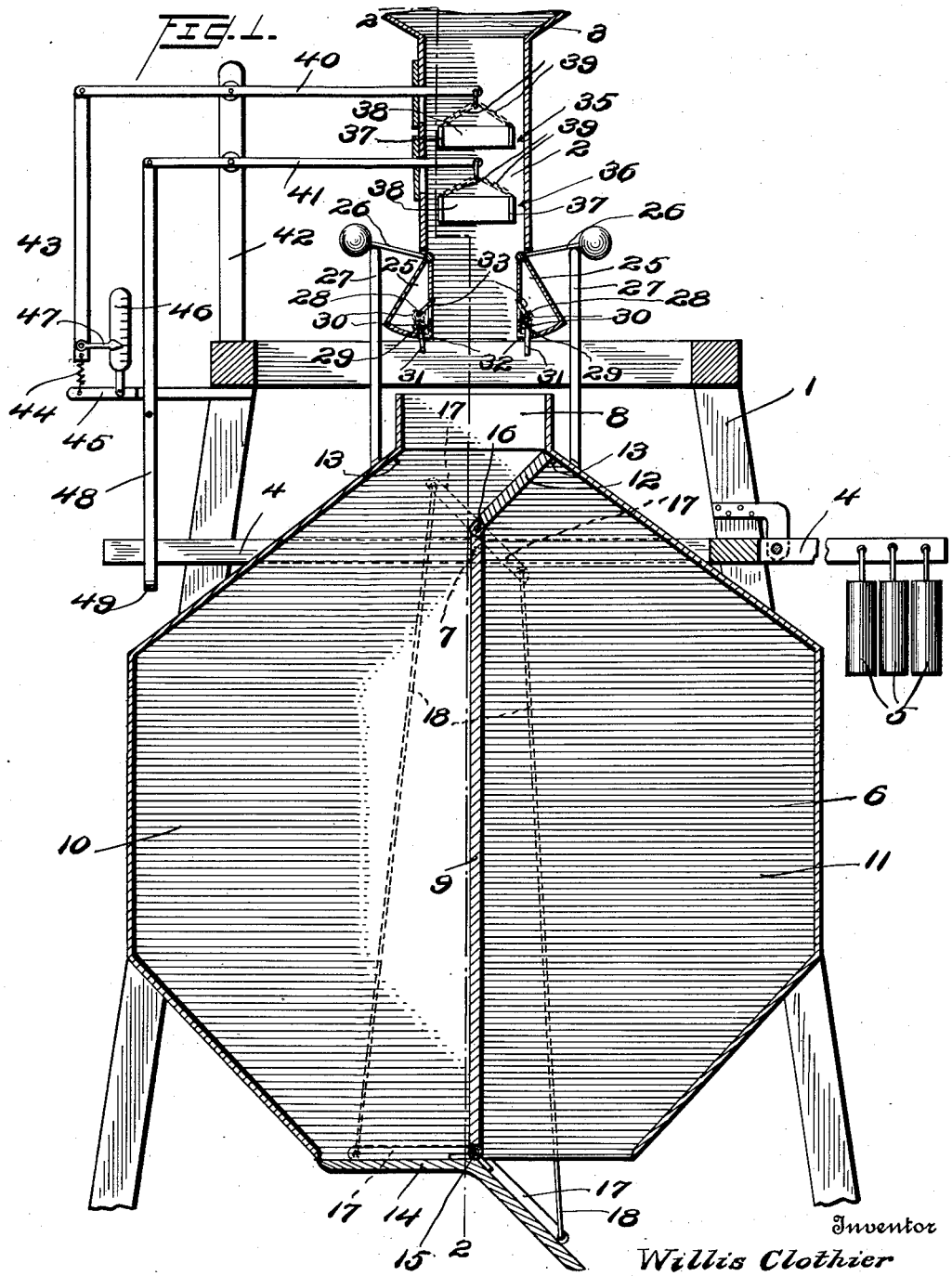

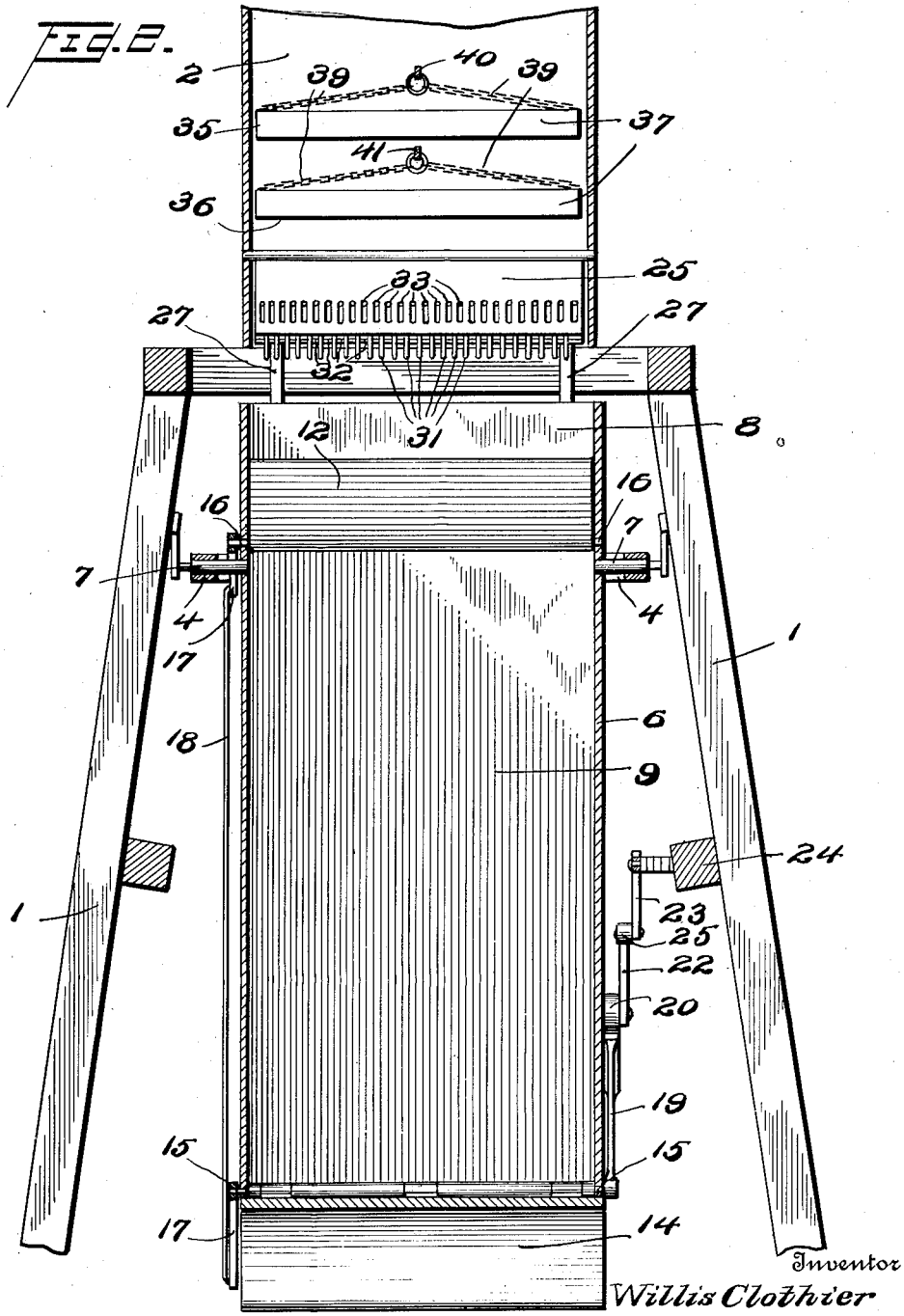

UNITED STATES PATENT OFFICE.

WILLIS CLOTHIER, OF NEW CASTLE, DELAWARE.

AUTOMATIC WEIGHING-MACHINE.

1,061,983.  Specification of Letters Patent.  Patented May 20, 1913.

Application filed December 3, 1912. Serial No. 734,695.

*To all whom it may concern:*

Be it known that I, WILLIS CLOTHIER, a citizen of the United States, residing at New Castle, in the county of Newcastle and State of Delaware, have invented certain new and useful Improvements in Automatic Weighing-Machines, of which the following is a specification.

My invention relates to improvements in automatic weighing machines, the object of the invention being to provide an improved weighing machine designed for weighing and measuring grain and the like in its passage from one receptacle to another, enabling a substantially continuous flow of grain, yet accurately weighing the same.

A further object is to provide improved means for controlling the feed of the grain and measuring the velocity or impulse of the grain as it flows from the supply to the weighing machine.

A further object is to provide an improved construction of gates having an improved arrangement of fingers which enable the grain to dribble to make up for deficiencies in the weighing compartments so as to insure accurate weighing of the material, and a quick operation of the mechanism to direct the material into one chamber of the weighing receptacle and then into the other.

With these and other objects in view, the invention consists in certain novel features of construction and combinations and arrangements of parts as will be more fully hereinafter described and pointed out in the claims.

In the accompanying drawings: Figure 1 is a view in vertical section illustrating my improvements. Fig. 2 is a view in vertical section on the line 2—2 of Fig. 1. Fig. 3 is a fragmentary elevation of the lower end of the weighing receptacle illustrating the manner of controlling the hinged bottom. Fig. 4 is a view in longitudinal section on an enlarged scale through one of the grain impulse measuring frames. Fig. 5 is a view in cross section on the line 5—5 of Fig. 4. Fig. 6 is an enlarged fragmentary view in vertical section showing the gates in partially closed position. Fig. 7 is a similar view showing the gates in closed position, and Fig. 8 is a fragmentary view in elevation illustrating the connection between the impulse controlled mechanism and the scale beam.

1 represents a supporting frame and 2 a spout discharging from a suitable hopper 3. 4 is a scale beam having suitable weights 5 thereon, and one end of this scale beam is fork shaped and in said fork shaped end, my weighing receptacle 6, is located and pivotally supported upon pins 7.

While, of course, the particular shape of the weighing receptacle may be varied, I have illustrated it of general octagonal form having an inlet spout 8 at its upper end located below the spout 2 and in line therewith. The receptacle 6 is divided by a vertical partition 9 into two chambers 10 and 11, the upper end of the partition 9 terminating short of the upper end of the receptacle and having a gate 12 hinged thereto by means of a shaft 16. This gate 12 is adapted to be swung from one side to the other, its movement being limited by stops 13 so as to close the upper end of either of said chambers 10 or 11, and guide the material into the other of said chambers.

A bottom 14 is hinged between its ends to the lower end of partition 9 by means of a shaft 15, and this bottom is adapted to be moved to close the open lower ends of either of said chambers 10 or 11. The bottom 14 is in the form of an obtuse angle and the shafts 15 and 16 extend beyond the receptacle 6 at one side, and are provided with crank arms 17 which are connected by rods 18. The crank arms 17 on their respective shafts are positioned at such an angle with relation to the shaft and to each other that the gate 12 and bottom 14 are compelled to move simultaneously so that when the bottom of one chamber is opened, the bottom of the other will be closed and the gate 12 will be moved to position to direct the material into the chamber having the closed bottom. The shaft 15 on its end opposite the end carrying arms 17, is provided with a triangular shaped block 19 and this block has curved recesses 20 at one end to receive a roller 21 on a pivoted locking arm 22 to hold the bottom in either of its positions. The arm 22 is pivotally connected to the frame 1, and is angular in form, and said arm is normally held in locking engagement with the block by means of an L-shaped lever 23. This lever 23 is pivoted at its angle to a cross bar 24 on frame 1, and at its free end has a roller 25 to rest upon the arm 22.

When the parts are in normal position as shown in Fig. 1, the point of contact of lever 23 with arm 22 is in alinement with the pivot of the lever, so that the arm is securely held. When the receptacle 6 descends, the arm 22 falls away from lever 23, and the weight of material on the bottom causes the latter to shift its position, swinging the block 19 so that the roller 21 will ride into the other recesses 20 in the block, and when the receptacle is again elevated, the door will be securely held in its changed position. In the lower end of spout 2, my improved gates 25 are pivotally supported. These gates 25 are segmental in form and at their pivots are provided with weighted arms 26 projecting out from the spout 2 and normally engaged by posts 27 on receptacle 6 to hold the gates 25 in the open position shown in Fig. 1. In the lower portion of each gate 2, parallel shafts 28 and 29 respectively are located, and these shafts have intermeshing segments 30 which compel them to move in opposite directions. On the lower shafts 29, fingers 31 are secured and extend through slots 32 in the gates 25 and on the upper shafts 28, the shorter fingers 33 are secured and project through slots 34 in the gates. The fingers 31 of one gate are located out of alinement with the fingers 31 on the other gate, and said fingers are adapted to be moved into such position so that one set of fingers will be located between the fingers of the other set, and the space between the gates entirely closed. The movement of the fingers 32 to close, is caused by the pressure of grain or the material upon the upper set of fingers 33, and as these upper set of fingers 33 are borne downward by the weight and impulse of the material, the segments 30 compel the lower set of fingers to be swung upwardly and inwardly toward each other and gradually come to a closed position.

The lower set of fingers 32, as above stated, are longer than the fingers 33, so that by gravity they normally assume an open position and carry the fingers 33 to a somewhat upright position, but it is to be understood that these upper fingers project sufficiently beyond the surface of the gates to insure a contact therewith of the grain or other material when the gates are moved to a partially closed position.

In the spout 2, I locate two movable frames 35 and 36 respectively, the former located above the latter. One of these frames is shown in Figs. 4 and 5, and comprises side bars 37 connected by blades 38. One set of these blades are positioned at an angle to the other set, so that the grain as it passes downwardly and through the frame by reason of its impulse and weight, causes the frames to be moved downwardly.

The frames are connected at their corners by chains 39 with levers 40 and 41 respectively. These levers are fulcrumed between their ends on a post 42 secured to frame 1, and the lever 40 is provided with a depending link 43 connected by a spring 44 with an arm 45 secured to frame 1. This arm 45 supports a scale 46, and a pointer 47 is provided on link 43, so that as the upper frame 35 is moved downwardly in the spout by the passage of material through the spout, the pointer 47 is drawn upwardly against the action of spring 44 and indicates on the scale 46 the impulse or speed of the moving material. The free end of lever 41 is provided with a depending link 48 which has fixed to its lower end, a cross bar 49, and this cross bar 49 extends below the forked end of beam 4, but is normally spaced from the lower face of the beam, but drawn in contact therewith by the weight and impulse of the material passing through the spout 2.

The operation is as follows: With the parts as illustrated in Fig. 1, the material descends through the spout 2 into the chamber 10 of the receptacle 6, and this flow of material continues until the weight of material in the chamber 10 begins to overbalance the weights 5, causing the receptacle to slowly move downward. This downward movement of the receptacle 6 moves the posts 27 away from the weighted arms 26, so that the gates 25 are swung inwardly by means of the weighted arms, tending to shut off the flow of grain. At the same time, the fingers 33 and 31 begin to operate, the former causing the latter to gradually come together, but allow the grain or other material to dribble between the fingers. As the grain or other material accumulates in the lower end of the spout by reason of the partially closed gates, the weight of such material upon the lower frame 36 will compel the latter to move downward slightly, thus slightly elevating the end of the beam 4 or in any event, preventing the beam from tilting until a sufficient quantity of the material has dribbled between the fingers to completely overbalance the weights 5. At such time the receptacle will move downwardly allowing the gates to fully close and such downward movement of the receptacle will cause the arm 22 to move away from lever 23, and instantly the weight of material on the bottom 14 will cause the bottom to shift its position. In other words, the material as it rushes through the open lower end of chamber 10 will force the bottom 15 to a position to close the lower end of chamber 11, and this movement, by reason of the rod 16, will be imparted to gate 12 and compel the latter to swing over into position to close chamber 10 and open communication with chamber 11. When the grain rushes out of chamber 10, the weights 5 will return the beam to its former position and the posts 27 will open gates 25, so that the grain will immediately flow into chamber 11 and the operation above described will be repeated. It will thus be seen that while the operation is substantially continuous, each weighing operation is complete in itself, and the parts will be so arranged as to insure the uniform operation, permitting the continuous flow of one receptacle into another, yet accurately measuring the quantity. Furthermore it will be noted that with my improvements, the impulse or momentum of the material through the spout 2 is utilized to insure a proper operation of the machine, and I dispense with the necessity for weights which are commonly used for this purpose.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a support, a spout, a scale beam, and a weighing receptacle secured to the scale beam below the spout, of pivoted gates in the spout, fingers supported by the gates and adapted to be moved into position with one set of fingers between the other set of fingers, and means for moving said fingers toward each other when the gates are moved toward each other, substantially as described.

2. The combination with a support, a spout, a scale beam, and a weighing receptacle secured to the scale beam below the spout, of pivoted gates in the spout, parallel shafts supported in the gates, segments on the shafts compelling them to move in opposite directions, relatively long fingers on the lowermost shafts, and other fingers on the upper shafts adapted when engaged by the moving material in the spout to move the lower set of fingers together, substantially as described.

3. The combination with a support, a spout, a scale beam, and a weighing receptacle secured to the scale beam below the spout, of pivoted gates in the spout, fingers supported by the gates and adapted to be moved into position with one set of fingers between the other set of fingers, and means for moving said fingers toward each other when the gates are moved toward each other, weighted arms on said gates tending to close the gates, and posts on the receptacle engaging the arms and holding the gates normally in open position, substantially as described.

4. The combination with a support, a spout, a scale beam, and a weighing receptacle secured to the scale beam below the spout, of pivoted gates in the spout, parallel shafts supported in the gates, segments on the shafts compelling them to move in opposite directions, relatively long fingers on the lowermost shafts, and other fingers on the upper shafts adapted when engaged by the moving material in the spout to move the lower set of fingers together, weighted arms on said gates tending to close the gates, and posts on the receptacle engaging the arms and holding the gates normally in open position, substantially as described.

5. The combination with a support, a spout, a scale beam, and a weighing receptacle secured to the scale beam below the spout, of pivoted gates in the spout, means on the receptacle normally holding the gates in open position, a movable frame in the spout, and means operated by the frame to momentarily hold the beam elevated after the receptacle has received a predetermined quantity of material, substantially as described.

6. The combination with a support, a spout, a scale beam, and a weighing receptacle secured to the scale beam below the spout, of pivoted gates in the spout, means on the receptacle normally holding the gates in open position, a movable frame in the spout, means operated by the frame to momentarily hold the beam elevated after the receptacle has received a pre-determined quantity of material, said frame comprising a plurality of angularly positioned blades against which the material engages in its passage through the spout, substantially as described.

7. The combination with a support, a spout, a scale beam, and a weighing receptacle secured to the scale beam below the spout, of pivoted gates in the spout, fingers in the gates adapted to move toward each other when the gates are partially closed, whereby the grain is permitted to dribble through the spout, a lever pivoted between its ends and projecting into the spout, a movable frame on the lever in the spout, a link pivotally connected to the opposite end of the lever, and means on the lower end of the link engaging under the receptacle carrying end of the scale beam, substantially as described.

8. The combination with a support, a spout, a scale beam, and a weighing receptacle secured to the scale beam below the spout, of pivoted gates in the spout, fingers supported by the gates and adapted to be moved into position with one set of fingers between the other set of fingers, means for moving said fingers toward each other when the gates are moved toward each other, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

9. The combination with a support, a spout, a scale beam, and a weighing receptacle secured to the scale beam below the spout, of pivoted gates in the spout, fingers supported by the gates and adapted to be moved into position with one set of fingers between the other set of fingers, means for moving said fingers toward each other when the gates are moved toward each other, weighted arms on said gates tending to close the gates, posts on the receptacle engaging the arms and holding the gates normally in open position, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

10. The combination with a support, a spout, a scale beam, and a weighing receptacle secured to the scale beam below the spout, of pivoted gates in the spout, parallel shafts supported in the gates, segments on the shafts compelling them to move in opposite directions, relatively long fingers on the lowermost shafts, and other fingers on the upper shafts adapted when engaged by the moving material in the spout to move the lower set of fingers together, weighted arms on said gates tending to close the gates, posts on the receptacle engaging the arms and holding the gates normally in open position, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

11. The combination with a support, a spout, a scale beam, and a weighing receptacle secured to the scale beam below the spout, of pivoted gates in the spout, means on the receptacle normally holding the gates in open position, a movable frame in the spout, means operated by the frame to momentarily hold the beam elevated after the receptacle has received a predetermined quantity of material, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

12. The combination with a support, a spout, a scale beam, and a weighing receptacle secured to the scale beam below the spout, of pivoted gates in the spout, means on the receptacle normally holding the gates in open position, a movable frame in the spout, means operated by the frame to momentarily hold the beam elevated after the receptacle has received a pre-determined quantity of material, a second movable frame in the spout, a scale indicating the movement of the last-mentioned frame, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

13. The combination with a support, a spout, a scale beam, and a weighing receptacle secured to the scale beam below the spout, of pivoted gates in the spout, means on the receptacle normally holding the gates in open position, a movable frame in the spout, means operated by the frame to momentarily hold the beam elevated after the receptacle has received a pre-determined quantity of material, said frame comprising a plurality of angularly positioned blades against which the material engages in its passage through the spout, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

14. The combination with a support, a spout, a scale beam, and a weighing receptacle secured to the scale beam below the spout, of pivoted gates in the spout, means on the receptacle normally holding the gates in open position, a movable frame in the spout, means operated by the frame to momentarily hold the beam elevated after the receptacle has received a pre-determined quantity of material, a second movable frame in the spout, a scale indicating the movement of the last-mentioned frame, said frames each comprising a plurality of angularly positioned blades against which the material engages in its passage through the spout, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

15. The combination with a support, a spout, a scale beam, and a weighing receptacle secured to the scale beam below the spout, of pivoted gates in the spout, fingers in the gates adapted to move toward each other when the gates are partially closed, whereby the grain is permitted to dribble through the spout, a lever pivoted between its ends and projecting into the spout, a movable frame on the lever in the spout, a link pivotally connected to the opposite end of the lever, means on the lower end of the link engaging under the receptacle carrying end of the scale beam, said receptacle divided into two chambers, a gate controlling the passage to the upper ends of said chambers, an angular bottom controlling the outlet of said chambers, devices connecting the last-mentioned gate and the bottom, whereby they are compelled to move in unison, means normally holding the bottom and gate against movement, and means permitting the weighted grain on the bottom to shift the bottom and the last-mentioned gate when the receptacle moves downwardly, substantially as described.

In testimony whereof I have signed my name to this specification in the presence of two subscribing witnesses.

WILLIS CLOTHIER.

Witnesses:
   CHARLES W. NICKERSON,
   NELLIE GALLOWAY.